United States Patent [19]

Widiger et al.

[11] 4,247,584

[45] Jan. 27, 1981

[54] COMPOSITION COMPRISING A BLEND OF EVA POLYMERS HAVING DIFFERING VA CONTENTS; FILMS AND LAMINATES MADE THEREFROM BY EXTRUSION; AND HEAT-SEALED FOOD BAGS MADE FROM THE LAMINATES

[75] Inventors: Almar T. Widiger, Parma, Ohio; Charles C. Hwo, Appleton, Wis.; Norman G. Gaylord, New Providence, N.J.; Pang-Chia Lu, Appleton, Wis.

[73] Assignee: American Can Company, Greenwich, Conn.

[21] Appl. No.: 41,306

[22] Filed: May 22, 1979

[51] Int. Cl.$^3$ .............. B65D 65/40; B65D 75/06; B65D 75/12; B65D 85/50
[52] U.S. Cl. ........................ 428/35; 206/524.2; 229/87 F; 264/173; 264/209.1; 264/210.1; 264/210.7; 264/288.4; 264/290.2; 264/514; 426/127; 428/194; 428/216; 428/516; 428/520; 525/222
[58] Field of Search .............. 525/222; 428/516, 518, 428/520, 35, 216, 194, 195; 206/524.2; 426/127; 264/173, 209, 210.1, 210.7, 288.4, 290.2, 514; 229/87 F; 156/306

[56] References Cited

U.S. PATENT DOCUMENTS

| | | | |
|---|---|---|---|
| 3,637,428 | 1/1972 | Aleckner | 428/516 |
| 3,745,054 | 7/1973 | Smedberg | 525/222 |
| 3,817,821 | 6/1974 | Gallini | 428/129 |
| 3,929,724 | 12/1975 | Miyauchi et al. | 525/222 |
| 3,932,692 | 1/1976 | Hirata et al. | 525/222 |
| 3,953,660 | 4/1976 | Ishida | 428/518 |
| 4,001,065 | 1/1977 | Penneck et al. | 526/324 |
| 4,082,877 | 4/1978 | Shadle | 428/516 |
| 4,116,914 | 9/1978 | Coran et al. | 525/222 |
| 4,126,649 | 11/1978 | Decrois | 525/222 |
| 4,127,688 | 11/1978 | Bieler et al. | 428/516 |

*Primary Examiner*—James C. Cannon
*Attorney, Agent, or Firm*—Robert P. Auber and Ira S. Dorman

[57] ABSTRACT

Molecularly oriented films, and compositions used therein, comprise blends of a first EVA copolymer having a relatively low VA content, and a second EVA copolymer having a relatively high VA content. The blend exhibits a balance of properties which permit ready processability for orientation, while affording high levels of strength, particularly at elevated temperatures. Consequently laminates may be produced which are well suited for shrink packaging of meat, especially when a high oxygen barrier resin provides one layer thereof.

49 Claims, 2 Drawing Figures

COMPOSITION COMPRISING A BLEND OF EVA POLYMERS HAVING DIFFERING VA CONTENTS; FILMS AND LAMINATES MADE THEREFROM BY EXTRUSION; AND HEAT-SEALED FOOD BAGS MADE FROM THE LAMINATES

BACKGROUND OF THE INVENTION

Copolymers of ethylene and vinyl acetate (EVA) are extensively used by the package industry, because they provide a number of very desirable properties for typical applications. Depending largely upon proportion of ethylene and vinyl acetate in such copolymers, they may exhibit very desirable heat sealing properties, good adhesion to other polymers, good strength and toughness, abrasion resistance, clarity, gloss, and low temperature flex; moreover, EVA copolymers may be readily processed and molecularly oriented, and they are relatively inexpensive.

Due to the foregoing, such resins are widely utilized in laminates with other polymers, which may be employed to enhance the strength and barrier properties of the composite. An especially desirable film of this sort is one which is produced by coating EVA copolymer upon a substrate of a vinylidene chloride-vinyl chloride copolymer (commonly known as "saran"). Such laminates are widely used in the meat packaging industry.

More particularly, an increasingly prevalent method of handling beef is to prepare primal cuts at the slaughterhouse, which are then shipped to a retail meat store or other outlet, where they are butchered into smaller cuts. This necessitates packaging the meat at the slaughterhouse in such a way so to protect it against oxygen exposure during shipping and handling, to minimize spoilage and discoloration. An especially effective method of so packaging the meat is to enclose it within a bag of a thermoplastic film having good oxygen barrier properties and the capacity to shrink under heat. Following evacuation and sealing of the bag about the meat, the package is subjected to an elevated temperature, whereupon the film shrinks and tightly encases the meat therewithin, thus producing an attractive and conveniently handled package, in which the meat is well protected and secure.

Notwithstanding the advantages, shrink-bag packaging of meat is not without its difficulties, many of which are attributable to limitations inherent in the films presently available for such applications. As will be appreciated, such a technique exposes the film to rather severe conditions, due to the nature of the contained product, as well as to the conditions under which the package must be formed.

Firstly, commercially available shrink films tend to have a fairly narrow range of operability, from the standpoint of the temperatures at which they must be shrunk. The film must respond to heat rapidly enough for commercial practicality, and yet must not exhibit such a level of shrink energy as would cause the film to pull apart during shrinkage, under its own internal forces. It is especially important to appreciate that the film is particularly vulnerable at the conditions of operation, due to the relatively high temperatures to which it must be exposed in order to produce a satisfactory level of response in the film, for commercial production.

Moreover, the shrink-related problems are seriously exasperbated when the contained cut of meat is one which includes protruding bones and/or significant depressions in its surface. Needless to say, the hard, irregular and often sharp-edge nature of bony material promote penetration through the film, and thus represent a primary source of failure in bags so utilized. The problem can be alleviated either by utilizing heavier gauge films or stronger materials, or by the inclusion in the package of an added member which covers the exposed bone, and thereby protects the bag against penetration.

Insofar as the presence of significant depressions in the meat surface is concerned, because packaging is carried out under vacuum, a pressure differential will develop in the overlying area of the bag, exposing that area to additional stress and making it a likely site for failure. Specifically, there is a tendency for shrink-holes to develop in such areas, under the combined effects of elevated temperatures and negative pressure; such holes, of course, admit oxygen into the bag, leading intolerably to spoilage of the contained meat.

Exemplary of the known prior art which has utilized EVA resins in combination with other plastics, to produce film laminates suitable for use in packaging applications, are the following U.S. Pats. No. 3,713,965, issued on Jan. 30, 1973 to Widiger, et al; No. 3,741,253, issued on June 26, 1973 to Brax, et al; No. 3,817,821, issued on June 18, 1974 to Gellini; and No. 3,924,051, issued on Dec. 2, 1975 to Wiggins, et al. Also of interest is United Kingdom Specification No. 1,385,196, published Feb. 26, 1975.

Specifically, U.S. Pat. No. 3,713,965 discloses a nonblocking film made from vinylidene chloride-vinyl chloride copolymer, and an EVA copolymer, which has blended with it a small amount of calcium carbonate and a fatty amide. U.S. Pat. No. 3,741,253 discloses laminates, especially useful for meat packaging, which include two layers of EVA copolymer and an intermediate layer of saran; one of the EVA layers is cross-linked, as by electron irradiation. In the U.S. Pat. No. 3,817,821, films are disclosed in which a blend EVA resins may be applied to a core of polyethylene; the copolymer blend layer produced a peelable heat-seal with itself. U.S. Pat. No. 3,924,051, discloses laminates of EVA and saran, products produced therefrom, and methods for the production thereof. Finally, the United Kingdom Specification discloses heat-shrinkable films consisting of layers of EVA copolymer on saran, wherein the EVA copolymer extracts plasticizer from the saran to maximize its oxygen barrier capability.

Accordingly, it is an object of the present invention to provide novel EVA compositions, which exhibit such levels of molecular orientability, and such other properties, as will render the compositions particularly well suited for use in a heat-shrinkable film.

It is also an object of the invention to provide novel heat-shrinkable films utilizing such EVA compositions, which films exhibit outstanding properties.

A specific object of the invention is to provide novel film laminates which are especially adapted to the packaging of meat products, and which exhibit high resistance to failure, especially due to shrink-hole formation, while preserving or improving other desirable properties which are typical of films of similar composition.

Another object of the invention is to provide novel bags produced from laminates of the foregoing type, which may be especially suitable for the packaging of meat.

Still another object of the invention is to provide a novel method by which heat-shrinkable films can be produced.

SUMMARY OF THE DISCLOSURE

It has now been found that certain of the foregoing and related objects of the present invention are readily attained in a heat-shrinkable film laminate comprised of a molecularly oriented base layer of a normally crystalline synthetic thermoplastic resin, and a molecularly oriented outer layer of an EVA blend. The blend is comprised of about 10 to 90 weight percent of a low EVA random copolymer containing about 2 to 12 percent of vinyl acetate and having a melt index of about 0.2 to 10, and about 90 to 10 weight percent of a high EVA random copolymer containing about 8 to 30 percent of vinyl acetate and having a melt index of about 0.2 to 5. In the blend, the percent of vinyl acetate in the low EVA copolymer is below that in the high EVA copolymer, and the weight average vinyl acetate content is about 4 to 15 percent.

In preferred embodiments of the laminate, the low EVA copolymer contains about 3 to 9 percent of vinyl acetate and has a melt index of about 0.3 to 3.0 and the high EVA copolymer contains about 9 to 18 percent of vinyl acetate and has a melt index of about 0.2 to 1.5. Additionally, the blend comprises about 25 to 75 weight percent of low EVA copolymer and about 75 to 25 weight percent of high EVA copolymer, it has a weight average vinyl acetate content of about 6 to 10 percent, and has a semi-log weight average melt index of about 0.3 to 0.6.

Most desirably, the laminate will employ a blend in which the low EVA copolymer contains about 4.5 to 5.0 percent of vinyl acetate and has a melt index of about 0.4 to 1.0, and in which the high EVA copolymer contains about 11 to 13 percent of vinyl acetate and has a melt index of about 0.25 to 0.6. Such a blend will also comprise about 40 to 60 weight percent of the low EVA copolymer and about 60 to 40 weight percent of the high VA copolymer, it will have a weight average vinyl acetate content of about 7.0 to 9.5 percent, and will have a semi-log weight average melt index of about 0.35 to 0.45. Ideally, in the outer layer of the laminates, the blend will exhibit a percent melt value of about 50 to 65 percent, as determined at 95° C. and a heating rate of 20 Centigrade degrees per minute, and a relative crystallinity value of about 36 to 52.

Generally, the resin of the base layer will be one selected from the group consisting of vinyl chloride polymers and copolymers, ethylene-vinyl alcohol copolymers, ethylene-vinyl acetate copolymers, ethylene-acrylic acid copolymers, olefin polymers and copolymers, nitrile polymers and copolymers, and mixtures thereof. Preferably, it will be selected from the group consisting of vinylidene chloride-vinyl chloride copolymers and ethylene-vinyl alcohol copolymers. When the base layer resin is a vinylidene chloride-vinyl cloride copolymer, it should contain about 90 to 70 weight percent of vinylidene chloride and about 10 to 30 weight percent of vinyl chloride. It is especially advantageous to include in such a resin about 1 to 10 percent, based upon the weight of the resultant mixture, of an ethylene-vinyl acetate copolymer containing about 28 to 32 percent of vinyl acetate, and having a melt index of about 5 to 45.

The laminate may additionally include a second outer layer, preferably one comprised of the blend, with the base layer providing a core between the outer layers thereof. In such a structure, the first-mentioned outer layer will usually be about 1.0 to 1.4 mils thick, the core layer will be about 0.3 to 0.5 mil thick, and the second outer layer will be about 0.5 to 0.7 mil thick. In addition, the first-mentioned and core layers are advantageously present in a ratio of about 1.7 to 4:1 with the second and core layers present in a ratio of about 1.0 to 2.5:1. It is especially desirable that the laminate hereof be produced by blown or tubular coextrusion of the component resins, most beneficially at a blow-up ratio of about 3 to 4:1 and a draw ratio of about 2 3:1, by blown bubble orientation.

Other objects of the invention are attained in a method for producing a heat-shrinkable film laminate, comprising the steps of: (a) blending a low EVA copolymer and a high EVA copolymer to produce a blend of the sort hereinbefore described; (b) coextruding, as a plural layer tube, the blend and a distinct, normally crystalline synthetic thermoplastic resin; (c) adjusting the temperature of the tube to permit effective molecular orientation therein; and (d) stretching the tube, at about that temperature, to effect at least uniaxial molecular orientation therein. Step (c) of the method will normally involve a temperature for orientation of about 70° to 100° and, preferably about 80° to 98°, Centrigrade. Step (d) is preferably effected by bubble orientation, and most desirably the tube will be biaxially oriented, at a blow-up ratio of about 3 to 4:1 and a draw ratio or about 2 to 3:1. In step (b), a second layer of the blend may be coextruded, with the layer of the distinct resin between the layers of the blend.

Further objects are attained by providing, as a composition of matter, a blend which may be utilized in the foregoing laminates, by providing films of such blends, and with methods for producing them. Other objects are provided by a bag which comprises a film of the sort hereinbefore described, fabricated by heat sealing together confronting portions of a heat-sealable layer thereof; most desirably, the film will be a laminate, heat sealed through an outer layer to provide a meat bag.

DETAILED DESCRIPTION OF THE ILLUSTRATED EMBODIMENT

Figure 1:
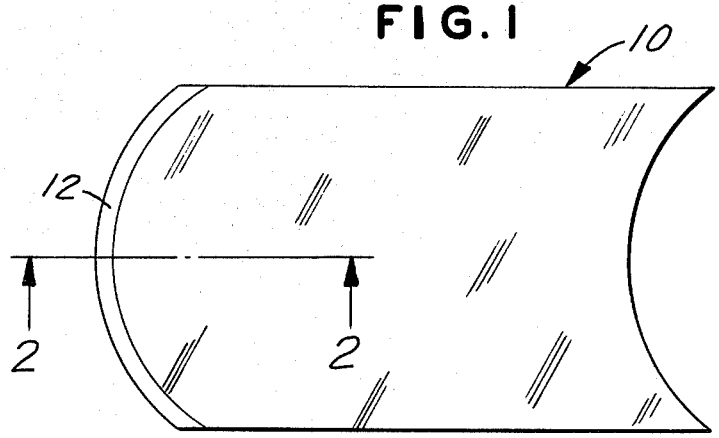
FIG. 1 is a plan view of a meat bag embodying the present invention.
Figure 2:
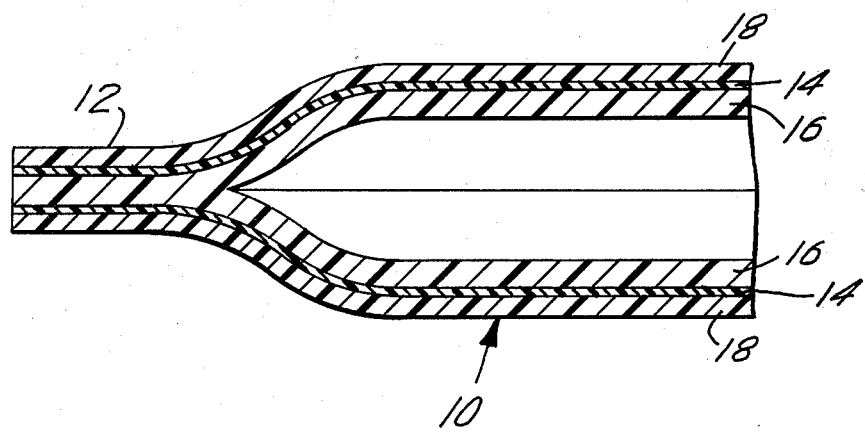
FIG. 2 is a fragmentary sectional view of the bag of FIG. 1, taken along line 2—2 thereof, drawn to a greatly enlarged scale and showing the heat sealed end of the bag.

Turning now in detail of the appended drawing, therein illustrated is a meat bag 10 embodying the present invention. The bag is comprised of a tubular length of a film laminate, closed at one end by an arcuate heat seal 12. The portion of the bag 10 adjacent to the heat seal is shown in FIG. 2, as is the profile of the laminate itself. The latter consists of a core layer 14, which may be saran, and two outer layers 16 and 18, at last one of which will be comprised of an EVA blend. Generally, the interior ply 16 will be provided by such a blend, and will be relatively thick, so as to most effectively produced the heat seal 12 by fusion of the resin under the applied heat and pressure of the sealing bar.

DETAILED DESCRIPTION OF THE PREFERRED EMBODIMENTS

Illustrative of the efficacy of the present invention are the following specific examples, wherein all percentages are on a weight basis, unless specified otherwise. For convenience or reference, the EVA resins employed in these examples are listed in Table One below, together with the vinyl acetate content (the ethylene content, of course, being the complement thereof), the melt index and the identity of the supplier:

TABLE ONE

| Resin | % VA | Melt Index | Source |
| --- | --- | --- | --- |
| UE 80159 | 12 | 0.5 | U. S. Industrial Chemicals Co. |
| NA 80479 | 4.5 | 0.4 | do |
| 3125 | 9.5 | 0.8 | E. I. du Pont de Nemours Co. |
| 3135X | 12 | 0.25 | do |
| 3000 | 5 | 1.0 | Chemplex Company |

In the foregoing table, the vinyl acetate content and melt indicies are those which are reported by the supplier of the particular resin.

EXAMPLE ONE

A series of three-layer laminates are produced by blown coextrusion and biaxial orientation of EVA blends, providing the two outside layers, and a saran formulation, providing the core therebetween. In all instances, the saran formulation contains (based upon the total weight thereof) 94.5 percent of Dow Chemical Company Saran 925 (a 73 percent vinylidene chloride, 27 percent vinyl chloride copolymer), 3.0 percent of du Pont Elvax 260 (a 72 percent ethylene, 28 percent vinyl acetate copolymer), and minor amounts of conventional plasticizers, lubricants, and heat stabilizers. Orientation is carried out at an initial temperature of about 98° C. using conventional plastic film blown bubble techniques, under conditions controlled to produce a blow-up ratio of about 3.25 and a draw ratio of about 2.50. In the final laminates, the two outer blend plies are 1.25 mils and 0.6 mil thick, respectively, and the saran core is 0.4 mil. For comparison, a series of films are produced utilizing the same saran formulation and ply profile, but employing, in place of the EVA blends, straight or bare (i.e., single resin) EVA copolymers.

The foregoing films are fabricated into bags by heat-sealing together (using an arcurate sealing bar) opposite interior surfaces (i.e., the thicker of the two "outer" plies of EVA) at intervals along the length of the tube, and concurrently severing the tube at those locations. The bags measure about 23 inches wide (corresponding to the width of the flattened tube) by about 38 inches long. In a cold room (about 5° C.), a refrigerated primal cut piece of blade chuck beef, weighing about 70 pounds and having both protruding bone and also surface cavity, is partially covered with a length of wax-impregnated bone-protecting cloth (sold commercially for that use), and is placed into each bag, which is then evacuated and hermetically sealed, by clipping, in a so-called "chamber vacuum clip" machine. The packages so produced are conveyed through a hot-water shrink tunnel, in which each is momentarily subjected to a curtain of water at a temperature of about 93° to 95° C., whereupon the films rapidly shrink into tight conformity to the contained meat. Note is taken of those packages in which the bag is loose on the meat, indicating that a breach has occurred; in those instances, the bag is carefully inspected to determine if the leak resulted from bone penetration, shrink-hole development (i.e., a rupture generally occuring over a surface depression), or from another cause, such as abrasion, clip cuts, or the like.

Set forth in Table Two below are the results of the foregoing test runs, together with other significant data:

TABLE TWO

| No. | Resin(s) | Weight Ratio | Melt % VA | Melt Index | % Melt | % Relative Crystallinity | Melting Point (°C.) | No. Bags | Shrink Holes % | Shrink Tension (g/in) MD | Shrink Tension (g/in) XMD |
| --- | --- | --- | --- | --- | --- | --- | --- | --- | --- | --- | --- |
| I | UE 80159: NA 80479 | 50:50 | 8.25 | 0.45 | 62 | 44.4 | 100 | 2850 | 0.8 | 130 (178)* | 233 |
| II | 3135X: NA 80479 | 50:50 | 8.25 | 0.35 | 55.4 | 39.7 | 102 | 800 | 0.5 | 178 | 250 |
| III | UE 80159: NA 80479 | 40:60 | 7.4 | 0.44 | 55 | 41.9 | 102 | 638 | 0.15 | 210 | 225 |
| IV | 3000: 3135X | 40:60 | 9.2 | 0.43 | 56 | 47.0 | 101 | 800 | 0.625 | 210 | 227 |
| V | 3000: UE 80159 | 40:60 | 9.2 | 0.66 | 55 | 49.6 | 101 | 268 | 4.4 | 217 | 243 |
| VI | 3125 | — | 9.5 | 0.8 | 77 | 40.6 | 95 | 100 | 5.0 | 52 | 83 |
| VII | 3135X | — | 12 | 0.25 | 80 | 39.3 | 94 | 20 | 25.0 | 65 | 105 |

*Value exhibited in second portion of total run of bags.

By way of explanation of Table Two, it should be pointed out that the vinyl acetate content set forth is, in the case of the blends (films I–V), a calculated average based upon the weight ratio of the components, and the manufacturers' specifications; the melt indicies are semi-log averages, determined using the method of ASTM D-1328, Procedure A, at 190° Centigrade and 2160 grams pressure. Of course, the corresponding values for the bare resin specimens (films VI and VII) are simply those which are provided by the supplier (note Table One). The percent melt, the percent relative crystallinity and the melting point values are determined by differential scanning calorimetry, as will be more fully discussed hereinbelow; however, it should be appreciated that the data presented are for the oriented blend or bare resin, rather than for the entire film. Shrink holes (i.e., the number of bags which failed due to such a hole) is reported as a percentage of the total number of bags run. Finally, shrink tension is expressed (in grams per inch of specimen width) in both the machine or longitudinal direction (MD) of the blown tube, and also the cross machine or transverse direction (XMD) thereof. It is determined by immersing in water, at 93° C., 1×6 inch samples of the laminate, clamped in a strain gauge; the values set forth are the average of three specimens.

From the Table, it can be seen that laminates falling within the preferred parameters of the invention (i.e., films I through IV) exhibited excellent resistance to shrink hole formation under actual conditions of operation; indeed, in each case, fewer than one percent of the bags run fail due to such holes. These results are in sharp contrast to those obtained with the single EVA resin laminates (numbers VI and VII) in which cases shrink hole percentages of 5 and 25 are recorded, respectively. While considerably less benefit is found to be provided by the blend utilized in laminate V, some reduction in shrink hole failure is nevertheless realized; it is believed that the less beneficial results are attributable to the relatively high melt index of the blend employed therein. Comparison of laminates IV and VI may be especially significant, in view of the very similar levels of vinyl acetate which are present in the blend and the bare resin, respectively.

Direct comparison is made of the results obtained with bags of film I, and with commercially available meat bags of the same nominal size, sold by the Cryovac division of W.R. Grace and Co., under the designation ("B-620". The film of the Cryovac bags is a laminate of EVA/saran/EVA, in which the EVA is a bare resin believed of contain about 9 percent VA and to have a melt index of about 3; one layer therof is electron beam irradiated to induce cross-linking, and thereby enhanced strength (as described in the above identified patent to Brax, et al). Notwithstanding that no cross-linking is induced in any larger of film I, bags fabricated from it perform at least comparably to the Cryovac bags (in terms of overall failure rate), and in some instances the instant bags are considerably better. It should, however, be understood that there may be some nominal cross-linking which occurs inherently in reacting and/or processing of the EVA copolymers; moreover, cross-linking of the resins of the blends herein described may provide even further benefits, within the scope of the present invention.

In all instances, it can be seen from Table Two that the blend laminates exhibit much higher levels of shrink tension at 93° C. than do the laminates produced with a single EVA copolymer. This indicates greater cohesion in the former films, and a concommitant ability to produce tighter, more secure and more attractive packaging, under suitable conditions.

From the Table, it can also be seen that the copolymer blends are consistently lower in percent melt values than are the single resins; this is true even when the vinyl acetate moieties of the resins and blends are comparable (note numbers IV through VI). Because percent melt (together with relative crystallinity) reflect the crystalline nature of a polymer, these data may explain the surprising resistance to shrink hole formation which is exhibited by the laminates utilizing the EVA blends. Since the degree of crystallinity is inversely related to the percent melt values, the relatively low values reported in Table Two for the blends indicates that they are relatively crystalline. It is believed that high crystallinity would strengthen the film, and thereby increase its ability to maintain integrity under stress at elevated temperatures, in turn reducing the tendency for shrink holes to form.

It is important to bear in mind that, to be suitable for their intended purpose, films made in accordance with this invention must also be processable to produce molecular orientation. Beyond certain levels, orientability decreases with increased crystallinity, until such a degree of crystallinity is reached that orientation becomes impossible, as a practical matter. Consequently it has heretofore been necessary to sacrifice, in films of EVA copolymer, strength for orientability, or vice versa.

The blends described herein, however, provide an unexpected balance of these properties, as indicated by the percent melt and melt index values that they exhibit, as well as the results that they produce in practical operation. The blends function as though, after orientation, they have higher levels of crystallinity (hot strength) than bare copolymers of comparable VA content would provide, while nevertheless affording very desirable processing characteristics.

Differential scanning calorimetry (DSC) is a technique which is used to characterize the crystalline nature of polymers, and is described in detail in *Thermal Characterization Techniques* by Slade and Jenkins, published in 1970 by Marcel Dekker, Inc. of New York, N.Y. Briefly stated, however, the analysis utilizes, as a measure of heat of transition, the power necessary to maintain the same temperature in a sample and in an inert specimen, during their simultaneous heating at a controlled rate. The area under the curve which results from plotting the applied power differential against temperature (the thermogram) is a direct measure of the heat of transition of the sample. Percent melt, as used herein, is the ratio of the amount of molten crystalline material at 95° C., to the total amount of the crystalline phase of the polymer; it is represented by the area under portion of the thermogram which is generated during heating from room temperature to 95° C., divided by the total area under the curve (room temperature to 150° Centrigrade). It reflects crystallinity and crystal size.

Relative crystallinity is also determined by DSC, and utilizes the solid-liquid phase transition curves of the polymer in question, and of a standard material (in this case, benzoic acid). It is the ratio (sample: standard) of the areas under their respective curves, divided by the weight of each specimen and multiplied by one hundred, and it is representative of the total energy necessary to melt the crystallites of the material. Finally, the melting point of the polymer is taken as the temperature at the peak of the DSC thermogram, since beyond that point a decreasing proportion of the energy applied is used in transition of the crystalline phase.

With the foregoing in mind, it can be stated in general that the EVA blends utilized herein require a suitable amount of a relatively low VA copolymer to provide sufficient crystallinity for strength, and a suitable amount of the relatively high VA copolymer to afford desirable processing characteristics (flow, lubricity), and adhesive and heat-sealing qualities; these amounts are stated in the ranges of components and VA percentage thereof, set forth hereinabove. The melt index of the blend must be sufficiently high for molecular orientation, and yet low enough to prevent excessive flow at elevated temperatures, which will cause shrink holes to be produced; the indicies of the components should also be relatively close to one another to ensure compatibility, and good optical properties. The melting point of the blend can also be a significant factor, since too low a value will reduce toughness, and too high a value will make the orientation temperature more critical to satisfactory results; generally, the melting point of the blend should range from about 97° to 110° C.

As indicated hereinabove, optimal values for percent melt of the blends, measured at 95° C. and at a heating rate of 20 C. degrees per minute, are about 50 to 65 percent, and preferably about 53 to 63 percent. For relative crystallinity (on the basis described), the optimal range is 36 to 52, with the preferred values lying in the range 40 to 47. These ranges indicate that, at 95° C., an appropriate proportion (indicated by percent melt) of the total crystallinity (shown by relative crystallinity) will remain, to afford a unique balance of strength and processability.

EXAMPLE TWO

An oriented laminate comparable to that of No. I of Example One is produced in substantially the same manner, but substituting for the saran layer a core of an extrusion grade ethylene-vinyl alcohol copolymer (EVOH) available under the name EVAL from Kuraray Co., Ltd. of Japan, and containing about 80 percent of vinyl alcohol. The profile of the film is 1.4 mils of EVA blend/0.2 mil of EVOH/0.65 mil of blend, with the EVOH permitting a reduction in gauge due to its normally superior oxygen barrier properties, compared to saran. In addition, the laminate exhibits high shrink levels and good toughness, thus permitting its beneficial use as a shrink bag for packaging bone-in beef blade chuck, and for other troublesome products, with low rates of bag failure from shrink holes.

EXAMPLE THREE

The EVA copolymer blend per se, used in film II of Example One is extruded from a slot die onto a chill roll at about 10° C., and is subsequently fluid compression rolled at a temperature of about 60° C. to produce uniaxial molecular orientation therein, in accordance with the technique described in U.S. Pat. Nos. 3,194,863; 3,504,075 and Re. 27,404. The resultant monolayer film exhibits a high degree of shrink in the machine direction, and has excellent barrier and toughness properties, as a frozen food wrap.

EXAMPLE FOUR

A bag for packaging turkey is produced in the same manner as is described in Example One, utilizing an oriented laminate comprised of 2.0 mils of the blend used in film III thereof, a 0.8 mil core of UE 80159 (see Table One), an a 0.2 mil outer layer of polypropylene; the laminate is coextruded and oriented using the technique and substantially the same conditions as are set forth in that previous Example. A turkey is placed into the bag, which is then evacuated, clipped, and shrunk in a shrink tunnel with water at about 95° C.; thereafter, the package is frozen. Although of a non-oxygen-barrier type, as is appropriate for a frozen product, the bag exhibits high shrink levels, tight conformity to the turkey, good abrasion resistance and convenient handling characteristics; moreover, it has excellent toughness and strength, at both high and also low temperatures.

As will be noted, the temperature of 95° C. has been used frequently in this specification as a basis for film characterization. This has been done because it is a typical temperature for meat packaging shrink operations; it should, of course, be appreciated that the concepts defined herein are not limited to any particular temperature of operation or use, except where otherwise and to the extent specifically noted (as in the methods described).

While perhaps of greatest benefit when used for food packaging, it should be appreciated that the films of the invention have considerably wider application. For example, shrink films are extensively used for wrapping pallet loads of various goods, with the films being shrunk tightly about the load (generally in a dry heat tunnel) to hold the individual items securely on the pallet during shipping and storage. Other uses will be readily apparent to those skilled in the art.

As is evident, the present invention contemplates both monolayer and also multilayer films of the EVA copolymer blends defined, with the structure being largely dependent upon the nature of the product and the intended manner of use. Although the laminates specifically described hereinbefore have contained three plies, it is obvious that multilayer films may include only two layers (in which case they may suitably be used for packaging cheese and similar low bulk food products), or they may be made with four or more plies. Thus, layers may be included to provide or enhance any of the various properties desired; for example, a Surlyn ionomer ply may be used for increased toughness, nylon for deep drawing, et. Thicknesses and relative positions in the structures will depend upon the properties sought, processing and handling constraints, economy, and other factors.

The resins employed may (and normally will) contain one or more additives to enhance their properties and/or to provide necessary protection or processing assistance. Thus, they may incorporate any of the conventional plasticizers, heat and light stabilizers, processing aids, and the like, in amounts which are typically used. Such additives and their uses are well known in the art, and need not be discussed in detail.

virtually any normally crystalline synthetic thermoplastic resin can be used in a laminate with the blends hereof, as long as the resin is susceptible to molecular orientation, and is bondable to the EVA copolymers. An exemplary listing of suitable substrate resins has been provided hereinabove; from the standpoint of barrier properties, the preferred resins are saran and EVOH copolymers, appropriately formulated (such as with EVA or another plasticizer, in saran) to give optimal performance. Bonding of the films to other elements, such as paper, foil, and the like, may also be advantageous. It is to be noted that the EVA blends defined herein exhibit excellent levels of adhesion to various substrates; indeed, those levels appear to be unexpectedly high, when compared to bare EVA resins of comparable VA content.

Mixing of the resins to produce the subject blends may be accomplished in any conventional manner, as will be readily apparent to those who are skilled in the art. It is also not critical that any particular method of extrusion or orientation be employed, although a blown tubular film coextrusion and bubble orientation technique is, by far, the most preferred in the present contemplation of the invention, due to the convenience, variability and thickness control that it affords. Specific extrusion, orientation, and treatment techniques which might be employed are described, for example, in the above-mentioned patents to Brax, et al. and to Wiggins, et al.

Thus, it can be seen that the present invention provides novel EVA compositions, which exhibit such levels of molecular orientability, and such other properties, as will render the compositions particularly well suited for use in a heat-shrinkable film. It also provides novel heat-shrinkable films utilizing such EVA compositions, which films exhibit outstanding properties. Specifically it provides film laminates which are especially adapted to the packaging of meat products, and which exhibit high reisistance to failure, especially due to shrink-hole formation, while preserving or improving other desirable properties which are typical of films of similar composition. In addition, the invention provides novel bags produced from laminates of the foregoing type, which may be especially suitable for the packaging of meat, as well as a novel method by which heat-shrinkable films can be produced.

Having thus described the invention, what is claimed is:

1. A bag for packaging meat, comprising a laminated film fabricated into a bag by heat sealing together confronting portions of an outer layer, said film being a laminate comprised of: a molecularly oriented base layer of a vinylidene chloride-vinly chloride copolymer containing about 90 to 70 weight percent of vinylidene chloride and about 10 to 30 weight percent of vinyl chloride; and a molecularly oriented outer layer of an EVA blend, said blend being comprised of about 10 to 90 weight percent of a low EVA random copolymer containing about 2 to 12 percent of vinly acetate and having a melt index of about 0.2 to 10, and about 90 to 10 weight percent of a high EVA random copolymer containing about 8 to 30 percent of vinyl acetate and having a melt index of about 0.2 to 5, the percent of vinyl acetate in said low copolymer being below that in said high copolymer, and said blend having a weight average vinyl acetate content of about 4 to 15 percent.

2. The bag of claim 1 wherein said laminate additionally includes a second outer layer comprised of said blend, said base layer comprising a core between said outer layers.

3. The bag of claim 1 wherein said laminate additionally includes a second outer layer of said blend, with said base layer comprising a core between said outer layers, and wherein said first-mentioned outer layer is about 1.0 to 1.4 mils thick, said core layer is about 0.3 to 0.5 mil thick, and said second outer layer is about 0.5 to 0.7 mil thick, said first-mentioned and core layers being present in a ratio of about 1.7 to 4:1, and said second and core layers being present in a ratio of about 1.0 to 2.5:1.

4. A bag for packaging meat, comprising a laminated film fabricated into a bag by heat sealing together confronting portions of an outer layer, said laminate being comprised of: a molecularly oriented base layer of a normally crystalline vinylidene chloride-vinyl chloride copolymer containing about 90 to 70 weight percent of vinylidene chloride and about 10 to 30 weight percent of vinyl chloride; and a biaxially molecularly oriented outer layer of an EVA blend, said blend being comprised of about 40 to 60 weight percent of a low EVA random copolymer containing about 4.5 to 5.0 percent of vinyl acetate and having a melt index of about 0.4 to 1.0, and about 60 to 40 weight percent of a high EVA random copolymer containing about 11 to 13 percent of vinyl acetate and having a melt index of about 0.25 to 0.6, and said blend having a weight average vinyl acetate content of about 7.0 to 9.5 percent, and a weight average melt index of about 0.35–0.45, said blend exhibiting, in said outer layer, a percent melt value of about 50 to 65 percent, as determined at 95° C. and a heating rate of 20 Centigrade degrees per minute, and a relative crystallinity value of about 36 to 52.

5. The bag of claim 4 wherein said laminate additionally includes a second outer layer of said blend with said base layer comprising a core between said outer layers, wherein said first-mentioned outer layer is about 1.0 to 1.4 mils thick, said core layer is about 0.3 to 0.5 mil thick, and said second outer layer is about 0.5 to 0.7 mil thick, and wherein said first-mentioned and core layers are present in a ratio of about 1.7 to 4:1 and said second and core layers are present in a ratio of about 1.0 to 2.5:1.

6. The bag of claim 4 wherein said laminate is produced by blown coextrusion of the component resins, and bubble orientation at a blow-up ratio of about 3 to 4:1 and a draw ratio of about 2 to 3:1.

7. A heat-shrinkable film laminate comprised of: a molecularly oriented base layer of a normally crystalline synthetic thermoplastic resin; and a molecularly oriented outer layer of an EVA blend, said blend being comprised of about 10 to 90 weight percent of a low EVA random copolymer containing about 2 to 12 percent of vinyl acetate and having a melt index of about 0.2 to 10, and about 90 to 10 weight percent of a high EVA random copolymer containing about 8 to 30 percent of vinyl acetate and having a melt index of about 0.2 to 5, the percent of vinyl acetate in said low copolymer being below that in said high copolymer, and said blend having a weight average vinyl acetate content of about 4 to 15 percent.

8. The laminate of claim 7 wherein said low EVA copolymer contains about 3 to 9 percent of vinyl acetate and has a melt index of about 0.3 to 3.0, said high EVA copolymer contains about 9 to 18 percent of vinyl acetate and has a melt index of about 0.2 to 1.5, and said contains about 25 to 75 weight percent of said low EVA copolymer and about 75 to 25 weight percent of said high EVA copolymer, has a weight average vinyl acetate content of about 6 to 10 percent, and a weight average melt index of about 0.3 to 0.6.

9. The laminate of claim 6 wherein said low EVA copolymer contains about 4.5 to 5.0 percent of vinyl acetate and has a melt index of about 0.4 to 1.0, said high copolymer contains about 11 to 13 percent of vinyl acetate and has a melt index of about 0.25 to 0.6, and said blend contains about 40 to 60 weight percent of said low EVA copolymer and about 60 to 40 weight percent of said high VA copolymer, has a weight average vinyl acetate content of about 7.0 to 9.5 percent, and a weight average melt index of about 0.35 to 0.45.

10. The laminate of claim 6 wherein, in said outer layer, said blend exhibits a percent melt value of about 50 to 65 percent, as determined at 95° C. and a heating rate of 20 Centigrade degrees per minute, and a relative crystallinity value of about 36 to 52.

11. The laminate of claim 6 wherein said resin of said base layer is selected from the group consisting of vinyl chloride polymers and copolymers, ethylene-vinyl alcohol copolymers, ethylene-vinyl acetate copolymers, ethyleneacrylic acid copolymers, olefin polymers and copolymers, nitrile polymers and copolymers, and mixtures thereof.

12. The laminate of claim 6 wherein said resin of said base layer is selected from the group consisting of vinylidene chloride-vinyl chloride copolymers and ethylene-vinyl alcohol copolymers.

13. The laminate of claim 12 wherein said vinylidene chloride-vinyl chloride copolymer contains about 90 to 70 weight percent of vinylidene chloride and about 10 to 30 weight percent of vinyl chloride.

14. The laminate of claim 12 wherein said vinylidene choride-vinyl chloride copolymer contains about 1 to 10 percent, based upon the weight of the resultant mixture, of an ethylene-vinyl acetate copolymer containing about 28 to 32 percent of vinyl acetate, and having a melt index of about 5 to 45.

15. The laminate of claim 7 wherein said laminate additionally includes a second outer layer, said base layer comprising a core between said outer layers.

16. The laminate of claim 15 wherein said second outer layer is comprised of said blend.

17. The laminate of claim 13 wherein said laminate additionally includes a second outer layer of said blend with said base layer comprising a core between said outer layers, and wherein said first-mentioned outer layer is about 1.0 to 1.4 mils thick, said core layer is about 0.3 to 0.5 mil thick, and said second outer layer is about 0.5 to 0.7 mil thick.

18. The laminate of claim 17 wherein said first-mentioned and core layers are present in a ratio of about 1.7 to 4:1 and said second and core layers are present in a ratio of about 1.0 to 2.5:1.

19. The laminate of claim 7 wherein said laminate is produced by blown coextrusion of the component resins at a blow-up ratio of about 3 to 4:1 and a draw ratio of about 2 to 3:1.

20. A heat-shrinkable film laminate comprised of: a molecularly oriented base layer of a normally crystalline vinylidene chloride-vinyl chloride copolymer; and a biaxially molecularly oriented outer layer of an EVA blend, said blend being comprised of about 40 to 60 weight percent of a low EVA random copolymer containing about 4.5 to 5.0 percent of vinyl acetate and having a melt index of about 0.4 to 1.0, and about 60 to 40 weight percent of a high EVA random copolymer containing about 11 to 13 percent of vinyl acetate and having a melt index of about 0.25 to 0.6, and said blend having a weight average vinyl acetate content of about 7.0 to 9.5 percent, and a weight average melt index of about 0.35–0.45.

21. The laminate of claim 20 wherein, in said outer layer, said blend exhibits a percent melt value of about 50 to 65 percent, as determined at 95° C. and a heating rate of 20 Centigrade degrees per minute, and a relative crystallinity value of about 36 to 52.

22. The laminate of claim 21 wherein said vinylidene chloride-vinyl chloride copolymer contains about 90 to 70 weight percent of vinylidene chloride and about 10 to 30 weight percent of vinyl chloride.

23. The laminate of claim 22 wherein said vinylidene chloride-vinyl chloride copolymer contains about 1 to 10 percent, based upon the weight of the resultant mixture, of an ethylene-vinyl acetate copolymer containing about 28 to 32 percent of vinyl acetate, and having a melt index of about 5 to 45.

24. The laminate of claim 22 wherein said laminate additionally includes a second outer layer of said blend with said base layer comprising a core between said outer layers, wherein said first-mentioned outer layer is about 1.0 to 1.4 mils thick, said core layer is about 0.3 to 0.5 mil thick, and said second outer layer is about 0.5 to 0.7 mil thick, and wherein said first-mentioned and core layers are present in a ratio of about 1.7 to 4:1 and said second and core layers are present in a ratio of about 1.0 to 2.5:1.

25. The laminate of claim 24 wherein said laminate is produced by blown coextrusion of the component resins at a blow-up ratio of about 3 to 4:1 and a draw ratio of about 2 to 3:1.

26. A heat-shrinkable film comprised of a molecularly oriented film of an EVA blend, said blend being comprised of about 10 to 90 weight percent of a low EVA random copolymer containing about 2 to 12 percent of vinyl acetate and having a melt index of about 0.2 to 10, and about 90 to 10 weight percent of a high EVA random copolymer containing about 8 to 30 percent of vinyl acetate and having a melt index of about 0.2 to 5, the percent of vinyl acetate in said low copolymer being below that in said high copolymer, and said blend having a weight average vinyl acetate content of about 4 to 15 percent.

27. The film of claim 26, wherein said low EVA copolymer contains about 3 to 9 percent of vinyl acetate and has a melt index of about 0.3 to 3.0, said high EVA copolymer contains about 9 to 18 percent of vinyl acetate and has a melt index of about 0.2 to 1.5, and said blend contains about 25 to 75 weight percent of said low EVA copolymer and about 75 to 25 weight percent of said high EVA copolymer, has a weight average vinyl acetate content of about 6 to 10 percent, and a weight average melt index of about 0.3 to 0.6.

28. The film of clam 26, wherein said low EVA copolymer contains about 4.5 to 5.0 percent of vinyl acetate and has a melt index of about 0.4 to 1.0, said high copolymer contains about 11 to 13 percent of vinyl acetate and has a melt index of about 0.25 to 0.6, and said blend contains about 40 to 60 weight percent of said low EVA copolymer and about 60 to 40 weight percent of said high EVA copolymer, has a weight average vinyl acetate content of about 7.0 to 9.5 percent, and a weight average melt index of about 0.35 to 0.45.

29. The film of claim 26 wherein said film exhibits a percent melt value of about 50 to 65 percent, as determined at 95° C. and a heating rate of 20 Centigrade degrees per minute, and a relative crystallinity value of about 36 to 52.

30. As a composition of matter adapted for use to produce a heat-shrinkable film laminate, a molecularly orientable EVA blend comprises of about 10 to 10 weight percent of a low EVA random copolymer containing about 2 to 12 percent of vinyl acetate and having a melt index of about 0.2 to 10, and about 90 to 10 weight percent of a high EVA random copolymer containing about 8 to 30 percent of vinyl acetate and having a melt index of about 0.2 to 5, the percent of vinyl acetate in said low copolymer being below that in said high copolymer, and said blend having a weight average vinyl acetate content of about 4 to 15 percent.

31. The blend of claim 30 wherein said low EVA copolymer contains about 3 to 9 percent of vinyl acetate and has a melt index of about 0.3 to 3.0, said high EVA copolymer contains about 9 to 18 percent of vinyl acetate and has a melt index of about 0.2 to 1.5, and said blend contains about 25 to 75 weight percent of said low EVA copolymer and about 75 to 25 weight percent of said high EVA copolymer, has a weight average vinyl acetate content of about 6 to 10 percent, and a weight average melt index of about 0.3 to 0.6.

32. The blend of claim 30 wherein said low EVA copolymer contains about 4.5 to 5.0 percent of vinyl acetate and has a melt index of about 4.0 to 1.0, said high copolymer contains about 11 to 13 percent of vinyl acetate and has a melt index of about 0.25 to 0.6, and said blend contains about 40 to 60 weight percent of said low EVA copolymer and about 60 to 40 weight percent of said high EVA copolymer, has a weight average vinyl acetate content of about 7.0 to 9.5 percent, and a weight average melt index of about 0.35 to 0.45.

33. The blend of claim 30 wherein, when biaxially oriented at a temperature of about 70° to 100° C., at transverse and longitudinal stretch ratios of 3 to 4:1 and 2 to 3:1, respectively, said blend exhibits a percent melt value of about 50 to 65 percent, as determined at 95° C. and a heating rate of 20 Centigrade degrees per minute, and a relative crystallinity value of about 36 to 52.

34. In a method for producing a heat-shrinkable film laminate, the steps comprising:
(a) blending a low EVA copolymer and a high EVA copolymer to produce said blend of claim 30;
(b) coextruding, as a plural layer tube, said blend and a distinct, normally crystalline synthetic thermoplastic resin;
(c) adjusting the temperature of said tube to permit effective molecular orientation therein; and
(d) stretching said tube at about said temperature to effect at least uniaxial molecular orientation therein.

35. The method of claim 34 wherein said blend of claim 31 is produced, in said step (a).

36. The method of claim 34 wherein said blend of claim 33 is produced, in said step (a).

37. The method of claim 34 wherein said distinct resin is selected from the group consisting of vinyl chloride polymers and copolymers, ethylene-vinyl alcohol copolymers, ethylene-vinyl acetate copolymers, ethylene-acrylic acid copolymers, olefin polymers and copolymers, nitrile polymers and copolymers, and mixture thereof.

38. The method of claim 37 wherein said distinct resin is a vinylidene chloride-vinyl chloride copolymer.

39. The method of claim 34 wherein, in said step (c), said temperature for orientation is about 70° to 100° C.

40. The method of claim 39 wherein said temperature is about 80° to 98° C.

41. The method of claim 34 wherein said step (d) is effected by bubble orientation.

42. The method of claim 41 wherein said tube is biaxially oriented, at a blow-up ratio of about 3 to 4:1 and a draw ratio of about 2 to 3:1.

43. The method of claim 34 wherein, in said step (b), a second layer of said blend is coextruded, with the layer of said distinct resin between the layers of said blend.

44. In a method for producing a heat-shrinkable film, the steps comprising:
(a) blending a low EVA copolymer and a high EVA copolymer to produce said blend of claim 30;
(b) extruding said blend as a tube;
(c) adjusting the temperature of said tube to permit effective molecular orientation therein; and
(d) stretching said tube at about said temperature to effect at least uniaxial molecular orientation therein.

45. The method of claim 44 wherein said blend of claim 31 is produced, in said step (a).

46. The method of claim 44 wherein said blend of claim 33 is produced, in said step (a).

47. The method of claim 44 wherein, in said step (c), said temperature of orientation is about 70° to 100° C.

48. The method of claim 44 wherein said step (d) is effected by bubble orientation.

49. The method of claim 44 wherein said tube is biaxially oriented.

* * * * *